(12) United States Patent
Yu et al.

(10) Patent No.: US 10,935,986 B1
(45) Date of Patent: Mar. 2, 2021

(54) GLIDING DEPTH CONTROL METHOD, SYSTEM AND DEVICE FOR BIOMIMETIC GLIDING ROBOTIC DOLPHIN

(71) Applicant: INSTITUTE OF AUTOMATION, CHINESE ACADEMY OF SCIENCES, Beijing (CN)

(72) Inventors: Junzhi Yu, Beijing (CN); Zhengxing Wu, Beijing (CN); Jian Wang, Beijing (CN); Shuaizheng Yan, Beijing (CN); Min Tan, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/069,868

(22) Filed: Oct. 14, 2020

Related U.S. Application Data

(63) Continuation of application No. PCT/CN2020/085043, filed on Apr. 16, 2020.

(30) Foreign Application Priority Data

Nov. 28, 2019 (CN) .......................... 201911189693.2

(51) Int. Cl.
G05D 1/08 (2006.01)
B63G 8/00 (2006.01)

(52) U.S. Cl.
CPC ........... *G05D 1/0875* (2013.01); *B63G 8/001* (2013.01); *B63G 2008/004* (2013.01); *G05D 2201/0201* (2013.01)

(58) Field of Classification Search
CPC ......... G05D 1/0875; G05D 2201/0201; B63G 8/001; B63G 2008/004
See application file for complete search history.

(56) References Cited

U.S. PATENT DOCUMENTS 3,491,997 A * 1/1970 Winters ................. A63H 23/10
472/129
5,740,750 A * 4/1998 Triantafyllou ............ B63B 1/36
114/67 R
(Continued)

FOREIGN PATENT DOCUMENTS

CN 1663881 A 9/2005
CN 101256409 A 9/2008
(Continued)

OTHER PUBLICATIONS

Junzhi Yu et al., Depth Control of a Bioinspired Robotic Dolphin Based on Sliding-Mode Fuzzy Control Method, IEEE Transactions on Industrial Electronics, Mar. 2018, pp. 2429-2438, vol. 65, No. 3.
(Continued)

*Primary Examiner* — Tyler J Lee
(74) *Attorney, Agent, or Firm* — Bayramoglu Law Offices LLC

(57) ABSTRACT

A gliding depth control method for a biomimetic gliding robotic dolphin includes: obtaining a preset gliding depth and a preset yaw angle; obtaining an estimated velocity by a sliding mode observer based on depth information and inertial navigation information, and obtaining a control quantity of pectoral fins on both sides of the biomimetic gliding robotic dolphin by a yaw controller in combination with the preset yaw angle; obtaining a segmented diving velocity reference trajectory by constructing and segmenting a Bézier curve; obtaining a diving control quantity by a model predictive control method in combination with the estimated velocity; obtaining a target position of a piston through a buoyancy principle, and obtaining a control quantity of the piston according to a current position of the piston; and controlling the biomimetic gliding robotic dol-
(Continued)

phin to glide based on the control quantity of the piston and the control quantity of the pectoral fins.

20 Claims, 6 Drawing Sheets

(56) References Cited

U.S. PATENT DOCUMENTS

| | | | | |
|---|---|---|---|---|
| 6,138,604 | A * | 10/2000 | Anderson | B63G 8/08 |
| | | | | 114/332 |
| 6,183,327 | B1 * | 2/2001 | Meyer | A63B 31/11 |
| | | | | 441/64 |
| 6,814,634 | B2 * | 11/2004 | Roberts | B63H 11/08 |
| | | | | 440/38 |
| 7,865,268 | B2 * | 1/2011 | Valdivia y Alvarado | ........... |
| | | | | A01K 85/18 |
| | | | | 700/245 |
| 9,090,320 | B2 * | 7/2015 | Rufo | B63H 1/36 |
| D788,246 | S * | 5/2017 | George, II | D21/808 |
| 9,715,231 | B2 * | 7/2017 | Kuniyasu | G05D 1/0011 |
| 9,718,523 | B2 * | 8/2017 | Tan | B63G 8/001 |
| 9,937,986 | B1 * | 4/2018 | Oh | B63G 8/08 |
| 10,031,525 | B2 * | 7/2018 | Dix | G05D 1/0278 |
| 10,191,489 | B1 * | 1/2019 | Rapoport | A01K 61/80 |
| 10,315,744 | B2 * | 6/2019 | Garthwaite | B63H 1/36 |
| 10,331,131 | B2 * | 6/2019 | Hanson | B63G 8/22 |
| 10,602,654 | B2 * | 3/2020 | Iwami | A01B 69/008 |
| 10,882,591 | B2 * | 1/2021 | Pieterkosky | B63B 35/44 |
| 2004/0152374 | A1 | 8/2004 | Roberts | |
| 2005/0235899 | A1 * | 10/2005 | Yamamoto | A63H 30/04 |
| | | | | 114/337 |
| 2006/0000137 | A1 * | 1/2006 | Valdivia y Alvarado | ........... |
| | | | | A01K 85/01 |
| | | | | 43/42.2 |
| 2012/0298030 | A1 * | 11/2012 | Lee | B60L 53/38 |
| | | | | 114/337 |
| 2014/0109821 | A1 * | 4/2014 | Rufo | B63H 1/36 |
| | | | | 114/337 |
| 2014/0343728 | A1 * | 11/2014 | Jun | B62D 57/032 |
| | | | | 700/259 |
| 2015/0120045 | A1 * | 4/2015 | Tan | B63G 8/001 |
| | | | | 700/250 |
| 2015/0223415 | A1 * | 8/2015 | Abhyanker | A01G 25/09 |
| | | | | 700/284 |
| 2018/0132459 | A1 * | 5/2018 | Baba | A01K 74/00 |
| 2018/0156622 | A1 * | 6/2018 | Mouthaan | G01C 21/3407 |
| 2018/0210456 | A1 * | 7/2018 | Uoya | G01C 21/20 |
| 2019/0135393 | A1 * | 5/2019 | Pieterkosky | B63J 99/00 |
| 2019/0152573 | A1 * | 5/2019 | Wiens | B63G 8/001 |
| 2020/0115018 | A1 * | 4/2020 | Aukes | B25J 9/003 |

FOREIGN PATENT DOCUMENTS

| | | |
|---|---|---|
| CN | 101315563 A | 12/2008 |
| CN | 101916071 A | 12/2010 |
| CN | 102962843 A | 3/2013 |
| CN | 104554681 A | 4/2015 |
| CN | 104627342 A | 5/2015 |
| CN | 104881045 A | 9/2015 |
| CN | 105676867 A | 6/2016 |
| CN | 109018271 A | 12/2018 |
| CN | 110758698 A | 2/2020 |
| DE | 19712257 A1 | 10/1998 |
| EP | 0867360 B1 | 7/2005 |
| KR | 20120129002 A | 11/2012 |

OTHER PUBLICATIONS

Michail Makrodimitris et al., Design and Implementation of a Low Cost, Pump-Based, Depth Control of a Small Robotic Fish, IEEE, 2014, pp. 1127-1132.

Fei Shen, Modeling and Control for Biomimetic Robotic Dolphin and Its Application in Water Quality Monitoring, A Dissertation Submitted to Graduate University of Chinese Academy of Sciences in partial fulfillment of the requirement for the degree of Doctor of Engineering, 2012, pp. 1-118.

Ming Wang et al., Central Pattern Generator Based Control and Implementation for a Pectoral-fin Propelled Robotic Fish, Robot, Mar. 2010, pp. 249-255, vol. 32, No. 2.

* cited by examiner

GLIDING DEPTH CONTROL METHOD, SYSTEM AND DEVICE FOR BIOMIMETIC GLIDING ROBOTIC DOLPHIN

CROSS REFERENCE TO THE RELATED APPLICATIONS

This application is the continuation application of International Application No. PCT/CN2020/085043, filed on Apr. 16, 2020 which is based upon and claims priority to Chinese Patent Application No. 201911189693.2, filed on Nov. 28, 2019, the entire contents of which are incorporated herein by reference.

TECHNICAL FIELD

The present invention relates to the technical field of underwater robot control, in particular, a gliding depth control method, system and device for a biomimetic gliding robotic dolphin.

BACKGROUND

In recent years, underwater biomimetic robots have attracted widespread attention, as they play an increasingly important role in aspects of underwater detection, search rescue, and facility maintenance. Biomimetic robotic dolphins achieve high maneuverability by imitating dolphins' dorsoventral oscillating motion, and successfully realize diving, rolling back and forth, and other difficult motions. However, the robotic dolphin consumes a substantial amount of energy when performing these motions. In order to improve the endurance capability of the robotic dolphin, researchers have introduced a buoyancy-driven mechanism of the underwater glider into the design of the biomimetic robotic dolphin, and developed a platform that is used for studying biomimetic gliding robotic dolphins. This design combines the gliding motion and the dolphin-like oscillating motion, and provides a high maneuverability and a strong endurance to the robotic dolphin, which significantly expands its application field and scope.

The problem of depth control remains an area of concentration in underwater robot research. High-precision depth control lays a solid foundation for autonomous navigation and path planning of underwater robots, which is critical to the autonomous operation of underwater robots. According to different control methods that are known, depth control for the underwater robots is mainly divided into three types: a gravity center adjustment method, a buoyancy adjustment method, and a movable fin surface adjustment method. The gravity center adjustment method typically uses a movable slider in the underwater robot to change the gravity center distribution to obtain a pitching moment, thereby realizing depth control. The buoyancy adjustment method realizes depth control by changing the water displacement of the underwater robot itself to perform buoyancy adjustment. These two methods only require static sealing operation, and are considered safe and easy to implement. However, due to the speed limitation of slider movement and buoyancy adjustment, the systems that are operated under these two methods experience a relatively large delay and are prone to overshoot. The movable fin surface adjustment method realizes depth control by controlling the rotation angle of the fin surface, which has a fast response, a simple structure and wide applications. However, this method has high requirements for sealing, and is prone to strong coupling effects on the yaw motion. The aforementioned methods are widely used in researches on underwater biomimetic robots. Aiming at the depth control problem of biomimetic robotic dolphins, by means of the gravity center adjustment method, Shen designed a fuzzy proportional-integral-differential (PID) controller with a depth error of 5 cm to provide gravity center adjustment. See, Shen Fei, "Modeling and Control for Biomimetic Robotic Dolphin and Its Application in Water Quality Monitoring", Ph.D. Dissertation, Beijing: Graduate School of Chinese Academy of Sciences, 2012.

Aiming at the depth control problem of biomimetic robotic fish, by means of the buoyancy adjustment method, Makrodimitris provides the depth control with a depth error of 2 cm. See, M. Makrodimitris, I. Aliprantis, and E. Papadopoulos, "Design and implementation of a low cost, pump-based, depth control of a small robotic fish", in Proc. IEEE/RSJ Int. Conf. Intell. Robots Syst., Chicago, USA, September 2014, pp. 1127-1132.

Aiming at the depth control problem of biomimetic robotic dolphins, by means of the movable fin surface adjustment method, Yu proveds the depth control with a depth error of 0.5 cm by controlling the rotation angle of the pectoral fins via an improved sliding mode fuzzy controller. See, J. Yu, J. Liu, Z. Wu, and H. Fang, "Depth control of a bioinspired robotic dolphin based on sliding mode fuzzy control method", IEEE Trans. Ind. Electron., vol. 65, no. 3, pp. 2429-2438, 2018.

The depth control for the biomimetic gliding robotic dolphin includes gliding depth control and dolphin depth control. The accuracy problem of the gliding depth control has not been solved satisfactorily because of the large delay and the low accuracy of the system. Aiming at the problem of gliding depth control of the biomimetic gliding robotic dolphin, the present invention designs a depth controller to control the buoyancy to further the goal of inproving depth control.

SUMMARY

To solve the problem of low accuracy of gliding depth control for existing biomimetic gliding robotic dolphins, as stated above, according to a first aspect of the present invention, a gliding depth control method for a biomimetic gliding robotic dolphin includes:

step S100: obtaining a preset gliding depth and a preset yaw angle;

step S200: obtaining an estimated velocity by a sliding mode observer based on depth information and inertial navigation information of the biomimetic gliding robotic dolphin at a current time; obtaining a control quantity of pectoral fins on both sides of the biomimetic gliding robotic dolphin by a yaw controller in combination with the preset yaw angle;

step S300: obtaining a segmented diving velocity reference trajectory by constructing and segmenting a Bézier curve based on the preset gliding depth and the depth information of the biomimetic gliding robotic dolphin at the current time, and obtaining a diving control quantity of the biomimetic gliding robotic dolphin by a model predictive control method in combination with the estimated velocity at the current time;

step S400: obtaining a target position of a piston in a buoyancy adjustment mechanism of the biomimetic gliding robotic dolphin through a buoyancy principle according to the diving control quantity; obtaining a control quantity of the piston according to a current position of the piston; and step S500: controlling the biomimetic gliding robotic dolphin to glide based on the control quantity of the piston and the control quantity of the pectoral fins on both sides of the biomimetic gliding robotic dolphin.

In some preferred embodiments, a method for "obtaining the estimated velocity by the sliding mode observer" in step S200 includes:

constructing a full-state three-dimensional dynamical model corresponding to the biomimetic gliding robotic dolphin based on a coordinate system of the biomimetic gliding robotic dolphin;

simplifying the full-state three-dimensional dynamical model by ignoring lateral motion to obtain a simplified dynamical model; and obtaining a velocity vector of the simplified dynamical model by the sliding mode observer based on the depth information and the inertial navigation information of the biomimetic gliding robotic dolphin at the current time, and using the velocity vector as the estimated velocity of the biomimetic gliding robotic dolphin.

In some preferred embodiments, the simplified dynamical model is expressed as follows:

$$M\dot{v} = -C(v)v - Dv + \tau,$$

wherein, $v = [u, w, q]^T$ denotes a forward velocity, a longitudinal velocity and a pitching angular velocity under a dolphin coordinate system, respectively; $M = \text{diag}\{m_1, m_2, m_3\}$ denotes an inertial mass matrix containing an added mass; $m_1, m_2, m_3$ denote mass parameters; $D = \text{diag}\{d_1, d_2, d_3\}$ denotes a damping matrix simplified as a constant term; $d_1, d_2, d_3$ denote damping parameters; $\tau = [0, u_c, \vec{a}G_m \sin(\theta)]$ denotes an input matrix; $u_c$ denotes a real-time control quantity; $\vec{a}$ denotes a position vector of a gravity center and a buoyancy center of the robot; $G_m$ denotes an acceleration of gravity; $\theta$ denotes a pitch angle; $C(v)$ denotes a Coriolis force and centripetal force matrix; and $\dot{v}$ denotes a velocity derivative.

In some preferred embodiments, a method for "obtaining the control quantity of the pectoral fins on both sides of the biometric gliding robotic dolphin by the yaw controller" in step S200 is:

$$u_f = k_f(k_p e_\psi + k_i \int e_\psi + k_d \dot{e}_\psi),$$

wherein, $u_f$ denotes the control quantity of the pectoral fins on both sides of the biomimetic gliding robotic dolphin, $k_f$ denotes a weight coefficient of the yaw controller, $k_p$ denotes a proportional factor, $k_i$ denotes an integral factor, $k_d$ denotes a differential factor, $e_\psi$ denotes a yaw angle error, and $\dot{e}_\psi$ denotes a derivative of the yaw angle error.

In some preferred embodiments, a method for "obtaining the segmented diving velocity reference trajectory by constructing and segmenting the Bézier curve" in step S300 includes:

constructing a second-order Bézier curve trajectory based on the preset gliding depth and the depth information of the biomimetic gliding robotic dolphin at the current time, and using the second-order Bézier curve trajectory as a depth reference trajectory of the biomimetic gliding robotic dolphin;

obtaining a diving velocity reference trajectory by taking a derivative of the depth reference trajectory;

segmenting the diving velocity reference trajectory according to an absolute value of a difference between the preset gliding depth and the depth information of the biomimetic gliding robotic dolphin at the current time and a value of a preset depth threshold, to obtain the segmented diving velocity reference trajectory.

In some preferred embodiments, the segmented diving velocity reference trajectory is calculated as follows:

$$Y_{ref} \begin{cases} c_1 V_{ref}, & \text{if } |d_r - d| > d_{theshold} \\ c_2 V_{ref}, & \text{otherwise} \end{cases},$$

wherein, $Y_{ref}$ denotes the segmented diving velocity reference trajectory, $c_1$ and $c_2$ denote weight coefficients, $d_r$ denotes a target depth, $d$ denotes a measured value of a depth sensor, $d_{theshold}$ denotes the preset depth threshold, and $V_{ref}$ denotes the diving velocity reference trajectory.

In some preferred embodiments, a method for "obtaining the target position of the piston in the buoyancy adjustment mechanism of the biomimetic gliding robotic dolphin through the buoyancy principle" in step S400 is:

$$r_{sr} = \frac{u_c(t)}{\rho g S},$$

wherein, $r_{sr}$ denotes the target position of the piston, $\rho$ denotes the density of water; $g$ denotes the acceleration of gravity, $S$ denotes a bottom area of the buoyancy adjustment mechanism, and $u_c(t)$ denotes the diving control quantity.

According to a second aspect of the present invention, a gliding depth control system for a biomimetic gliding robotic dolphin includes a preset value acquisition module, a pectoral fin control acquisition module, a diving control acquisition module, a piston control acquisition module, and a gliding control module.

The preset value acquisition module is configured to obtain a preset gliding depth and a preset yaw angle.

The pectoral fin control acquisition module is configured to obtain an estimated velocity by a sliding mode observer based on depth information and inertial navigation information of the biomimetic gliding robotic dolphin at a current time, and obtain a control quantity of pectoral fins on both sides of the biomimetic gliding robotic dolphin by a yaw controller in combination with the preset yaw angle.

The diving control acquisition module is configured to obtain a segmented diving velocity reference trajectory by constructing and segmenting a Bézier curve based on the preset gliding depth and the depth information of the biomimetic gliding robotic dolphin at the current time, and obtain a diving control quantity of the biomimetic gliding robotic dolphin by a model predictive control method in combination with the estimated velocity at the current time.

The piston control acquisition module is configured to obtain a target position of a piston in a buoyancy adjustment mechanism of the biomimetic gliding robotic dolphin through a buoyancy principle according to the diving control quantity, and obtain a control quantity of the piston according to a current position of the piston.

And the gliding control module is configured to control the biomimetic gliding robotic dolphin to glide based on the control quantity of the piston and the control quantity of the pectoral fins on both sides of the biomimetic gliding robotic dolphin.

The third aspect of the present invention provides a storage device, wherein a plurality of programs are stored in the storage device. The programs are configured to be loaded and executed by a processor to implement the gliding depth control method for the biomimetic gliding robotic dolphin described above.

According to a fourth aspect of the present invention, a processing device includes a processor and a storage device. The processor is configured to execute a plurality of programs, and the storage device is configured to store the plurality of programs. The programs are configured to be loaded and executed by the processor to implement the gliding depth control method for the biomimetic gliding robotic dolphin described above.

The present invention has the following advantages.

The present invention improves the accuracy of the gliding depth control for the biomimetic gliding robotic dolphin. According to the present invention, a full-state dynamical model of the biomimetic gliding robotic dolphin is constructed, and the full-state dynamical model is simplified by ignoring the lateral motion to obtain a simplified dynamic model. An estimated velocity of the biomimetic gliding robotic dolphin is obtained by a sliding mode observer using depth, attitude and other information. In consideration of the large delay of the system of the biomimetic gliding robotic dolphin, a segmented Bézier reference trajectory is designed based on the estimated velocity, and piston motion in the buoyancy adjustment mechanism of the biomimetic gliding robotic dolphin is adjusted by a depth controller based on model prediction to control the buoyancy, so as to achieve high-accuracy gliding depth control.

Additionally, the control quantity of pectoral fins on both sides of the biomimetic gliding robotic dolphin is obtained by an improved PID yaw controller, and the gliding attitude is adjusted by the differential motion of the movable pectoral fins. In this way, during the gliding depth control for the biomimetic gliding robotic dolphin, the yaw disturbance is avoided, and the heading of the biomimetic gliding robotic dolphin is maintained unchanged.

BRIEF DESCRIPTION OF THE DRAWINGS

Other features, objectives and advantages of the present invention will be obvious by the detailed descriptions of the non-restrictive embodiments with reference to the drawings.

DETAILED DESCRIPTION OF THE EMBODIMENTS

Figure 1:
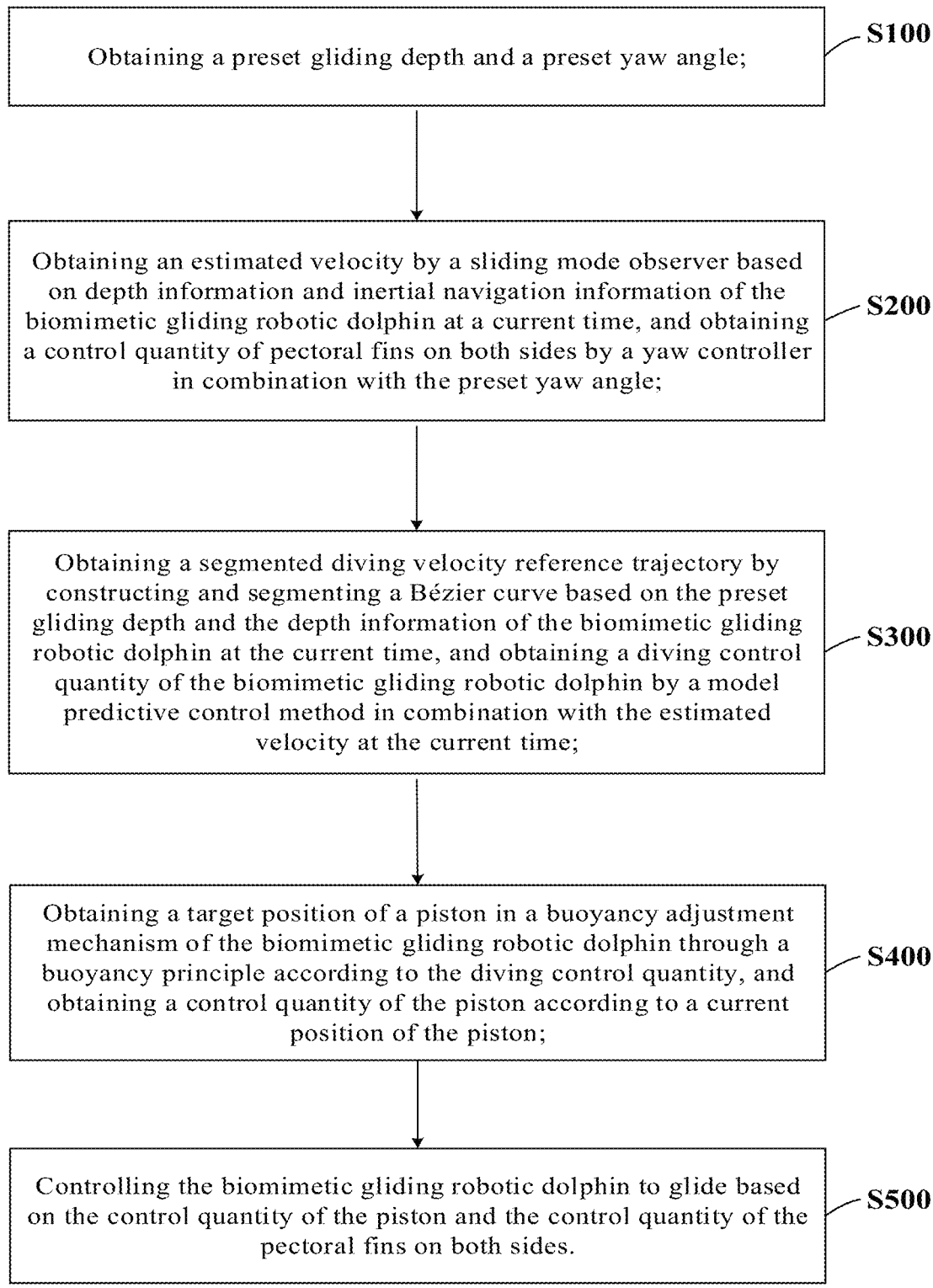
FIG. 1 is a flow chart of the gliding depth control method for the biomimetic gliding robotic dolphin according to an embodiment of the present invention.

In order to make the objectives, technical solutions and advantages of the present invention clearer, the technical solutions in the embodiments of the present invention are described below with reference to the drawings. Obviously, the described embodiments are a part of embodiments of the present invention rather than all the embodiments. Based on the embodiments of the present invention, all other embodiments obtained by those having ordinary skill in the art without creative efforts shall fall within the scope of protection of the present invention.

The present invention is further described in detail below in conjunction with the drawings and embodiments. It should be understood that the specific embodiments described herein are used only for explaining the present invention rather than limiting the present invention. Furthermore, it should be noted that, for the convenience of description, only parts relating to the present invention are shown in the drawings.

It should be noted that the embodiments and the features in the embodiments of the present invention can be combined with each other when no in conflict.

As shown in FIG. 1, a gliding depth control method for a biomimetic gliding robotic dolphin of the present invention includes the following steps.

Step S100: a preset gliding depth and a preset yaw angle are obtained.

Step S200: an estimated velocity is obtained by a sliding mode observer based on depth information and inertial navigation information of the biomimetic gliding robotic dolphin at a current time, and a control quantity of pectoral fins on both sides of the biomimetic gliding robotic dolphin is obtained by a yaw controller in combination with the preset yaw angle.

Step S300: a segmented diving velocity reference trajectory is obtained by constructing and segmenting a Bézier curve based on the preset gliding depth and the depth information of the biomimetic gliding robotic dolphin at the current time, and a diving control quantity of the biomimetic gliding robotic dolphin is obtained by a model predictive control method in combination with the estimated velocity at the current time.

Step S400: a target position of a piston in a buoyancy adjustment mechanism of the biomimetic gliding robotic dolphin is obtained through a buoyancy principle according to the diving control quantity, and a control quantity of the piston is obtained according to a current position of the piston.

Step S500: the biomimetic gliding robotic dolphin is controlled to glide based on the control quantity of the piston and the control quantity of the pectoral fins on both sides of the biomimetic gliding robotic dolphin.

In order to clearly illustrate the gliding depth control method for the biomimetic gliding robotic dolphin of the present invention, each step in an embodiment of the method of the present invention is described in detail below with reference to the drawings.

Step S100: a preset gliding depth and a preset yaw angle are obtained.

In the present embodiment, the preset gliding depth and the preset yaw angle for controlling the biomimetic gliding robotic dolphin to glide are first obtained. Specifically, the preset gliding depth is set manually, and the preset yaw angle is set to the initial direction, namely the heading direction remains unchanged.

Step S200: an estimated velocity is obtained by a sliding mode observer based on depth information and inertial navigation information of the biomimetic gliding robotic dolphin at the current time, and the control quantity of the pectoral fins on both sides of the biomimetic gliding robotic dolphin is obtained by a yaw controller in combination with the preset yaw angle.

Figure 3:
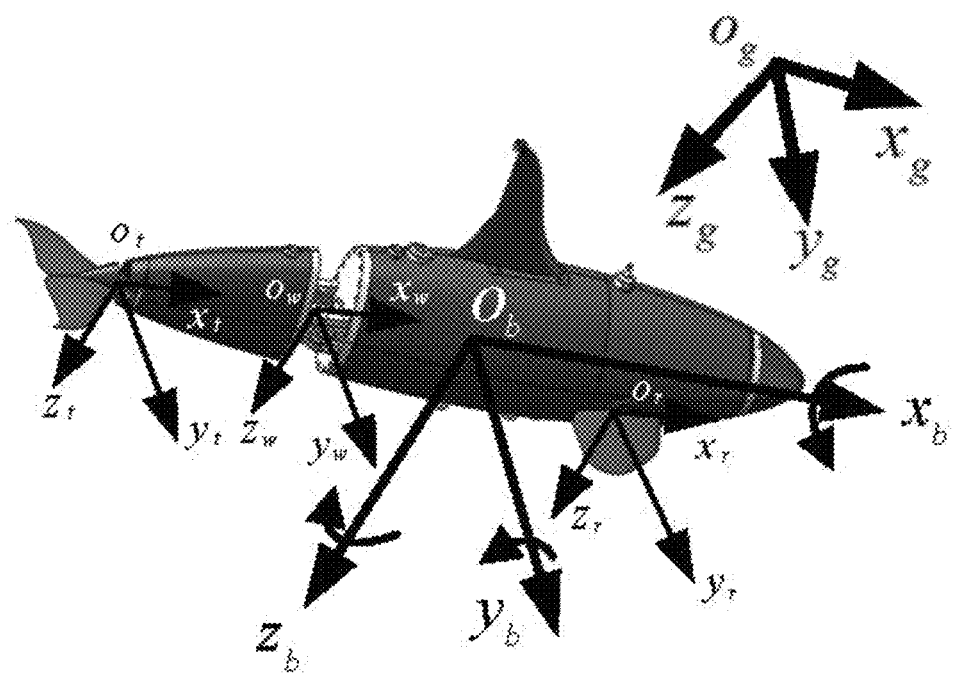
FIG. 3 is a schematic diagram of the coordinate system of the system of the biomimetic gliding robotic dolphin according to an embodiment of the present invention.

FIG. 3 schematically shows the coordinate system of the system of the gliding robotic dolphin, wherein $c_g=o_g x_g y_g z_g$ denotes a global inertial coordinate system, and $c_b=o_b x_b y_b z_b$ denotes a dolphin coordinate system. The x-axis direction of the dolphin coordinate system is the positive direction of the head of the dolphin, and the z-axis direction of the dolphin coordinate system is along the positive gravity direction.

Besides, body-fixed coordinate systems are established at the corresponding movable joints and include $c_w=o_w x_w y_w z_w$, $c_t=o_t x_t y_t z_t$, $c_l=o_l x_l y_l z_l$ and $c_r=o_r x_r y_r z_r$ which denote a waist coordinate system, a tail coordinate system, a left pectoral fin coordinate system and a right pectoral fin coordinate system, respectively.

Figure 4:
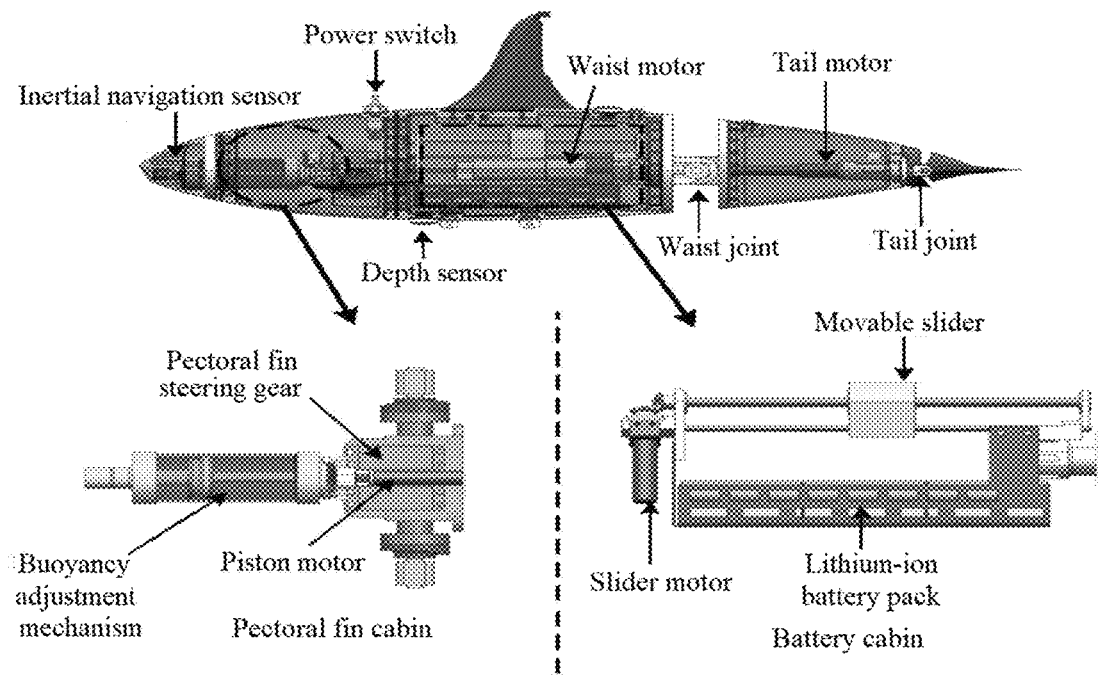
FIG. 4 is a schematic diagram of an electromechanical structure of the biomimetic gliding robotic dolphin according to an embodiment of the present invention.

FIG. 4 is a schematic diagram of the electromechanical structure of the biomimetic gliding robotic dolphin, which mainly includes three cabins: a pectoral fin cabin, a battery cabin and a waist-tail cabin. FIG. 4 shows the structure of the pectoral fin cabin and the structure of the battery cabin. The pectoral fin cabin includes a buoyancy adjustment mechanism, a piston motor and a pectoral fin steering gear. The battery cabin includes a movable slider, a slider motor and a lithium-ion battery pack. Each of the waist joint, the tail joint, the buoyancy adjustment mechanism and the gravity center adjustment mechanism is driven by a motor, and the pectoral fins on both sides of the biomimetic gliding robotic dolphin are driven by the steering gear. The biomimetic gliding robotic dolphin further includes various sensors and a power switch. FIG. 4 shows an inertial navigation sensor and a depth sensor.

The full-state three-dimensional dynamical model of the biomimetic gliding robotic dolphin is constructed based on the coordinate systems in FIG. 3, which has both a gliding mode and a dolphin mode. Specifically, the gliding mode is calculated by using the kinetic energy-momentum relation as shown in formulas (1) and (2):

$$p = {}^g R_b P \quad (1)$$

$$\pi = {}^g R_b \Pi + l \times p \quad (2)$$

wherein, P and π denote a system momentum and an angular momentum under the inertial coordinate system, respectively. P and Π denote a system momentum and an angular momentum under the dolphin coordinate system, respectively. ${}^g R_b$ denotes a rotation matrix, and l denotes a vector from the origin of the inertial coordinate system to the origin of the dolphin coordinate system.

Newton-Euler equations of the gliding mode are established by calculating system kinetic energy.

With respect to the dolphin mode, Newton-Euler equations of the waist joint, the tail joint, the left pectoral fin joint and the right pectoral fin joint are established separately according to a multi-link dynamics theory, and the force and the moment of each joint are obtained separately through the velocity transfer of forward kinematics, so as to obtain the acceleration and the velocity of each joint.

The above dynamical model is simplified by ignoring the lateral motion to be suitable for a real embedded platform, as shown in formula (3):

$$M\dot{v} = -C(v)v - Dv + \tau, \quad (3)$$

wherein, $v=[u, w, q]^T$ denotes a forward velocity, a longitudinal velocity and a pitching angular velocity under the dolphin coordinate system, respectively; $M=\text{diag}\{m_1, m_2, m_3\}$ denotes an inertial mass matrix containing added mass; $m_1, m_2, m_3$ denote mass parameters; $D=\text{diag}\{d_1, d_2, d_3\}$ denotes a damping matrix simplified as a constant term; $d_1$, $d_2$, $d_3$ denote damping parameters; $\tau=[0, u_c, \vec{a} G_m \sin(\theta)]$ denotes an input matrix; C(v) denotes a Coriolis force and centripetal force matrix, and $$C(v) = \begin{pmatrix} 0 & 0 & m_2 w \\ 0 & 0 & -m_1 u \\ -m_2 w & m_1 u & 0 \end{pmatrix};$$

$\dot{v}$ denotes a velocity derivative; $u_c$ denotes a real-time control quantity; $\vec{a}$ denotes a position vector of the gravity center and the buoyancy center of the robot; $G_m$ denotes the acceleration of gravity; θ denotes a pitch angle.

Therefore, the vertical component is extracted through the simplified dynamical model according to the Coriolis force and centripetal force matrix to obtain formula (4):

$$\dot{w} = -\frac{d_2}{m_2} w + \frac{u_c}{m_2} - \frac{m_1}{m_2} u q \quad (4)$$

wherein, $\dot{w}$ denotes a diving velocity derivative.

Figure 5:
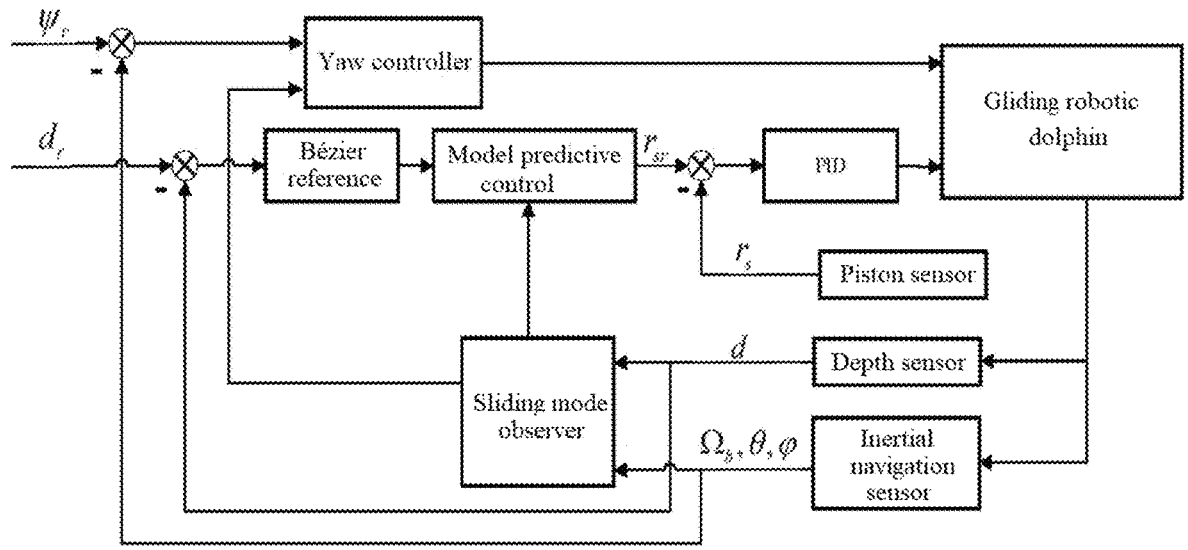
FIG. 5 is a schematic diagram of a gliding depth control structure of the biomimetic gliding robotic dolphin according to an embodiment of the present invention.
Figure 6A:
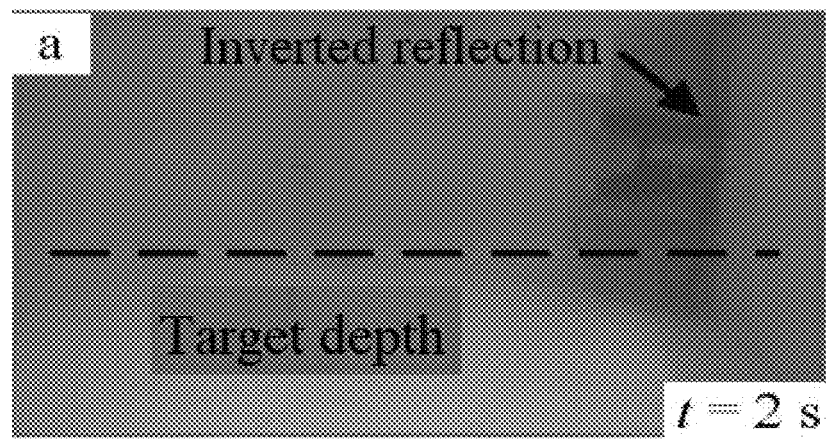
FIGS. 6(A)-6(I) are schematic diagrams showing a gliding depth control experiment of the biomimetic gliding robotic dolphin according to an embodiment of the present invention.
Figure 6B:
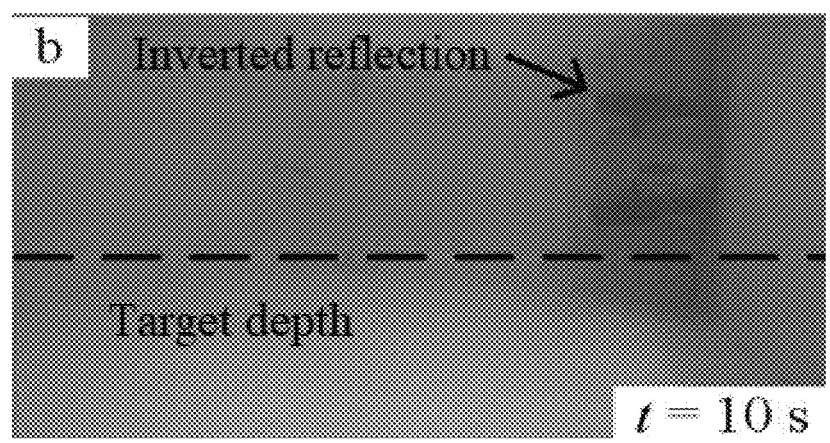
Figure 6C:
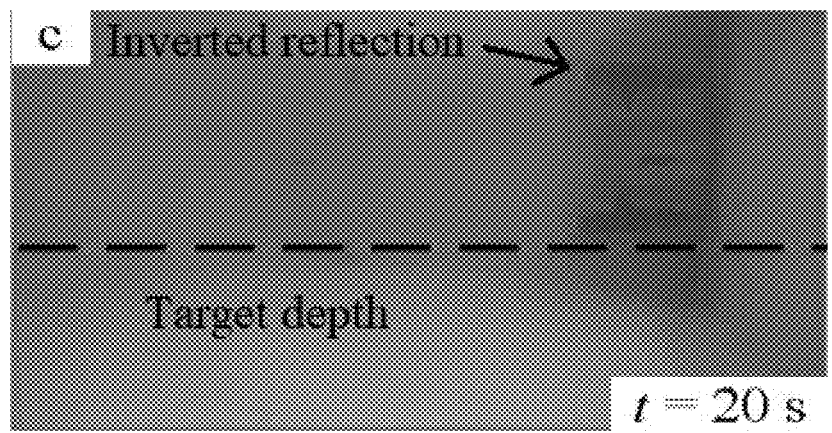
Figure 6D:
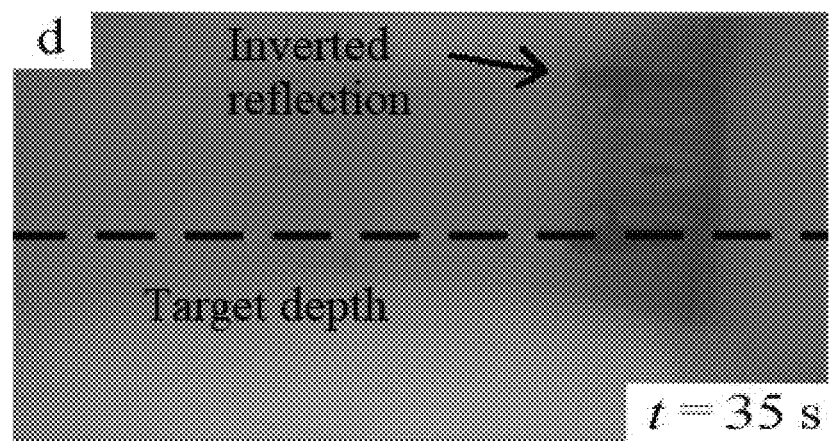
Figure 6E:
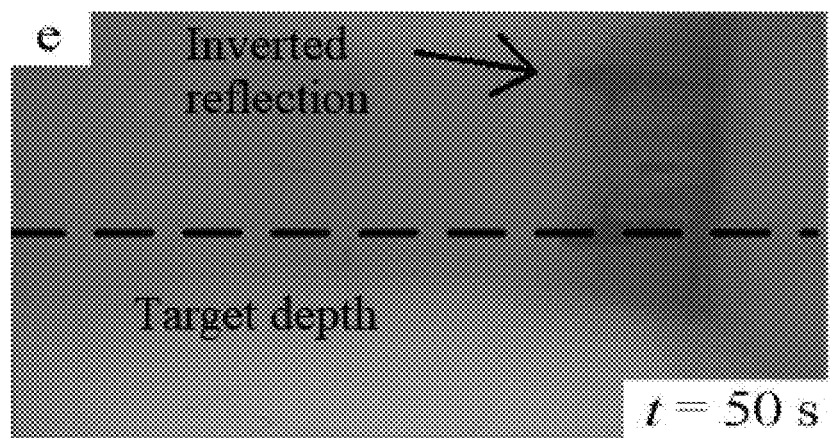
Figure 6F:
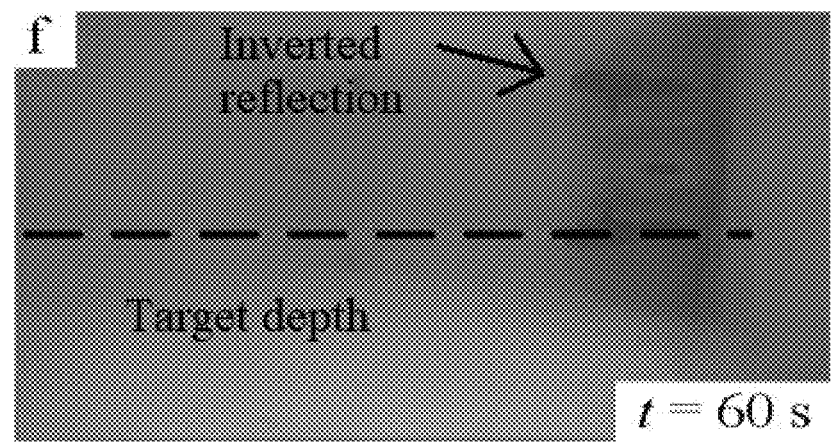
Figure 6G:
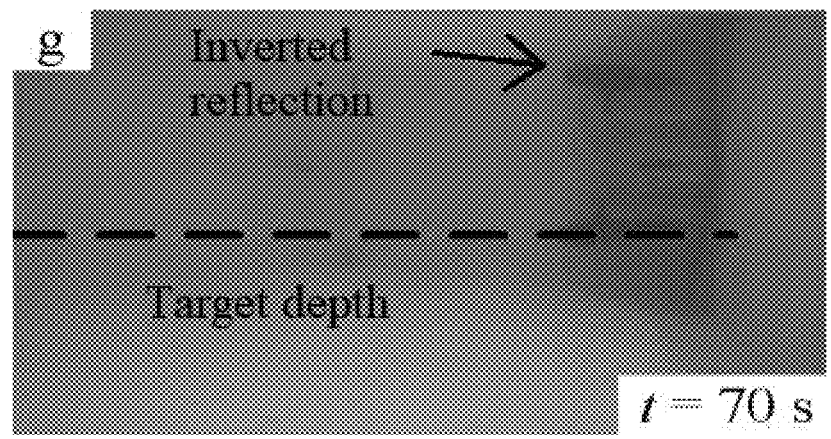
Figure 6H:
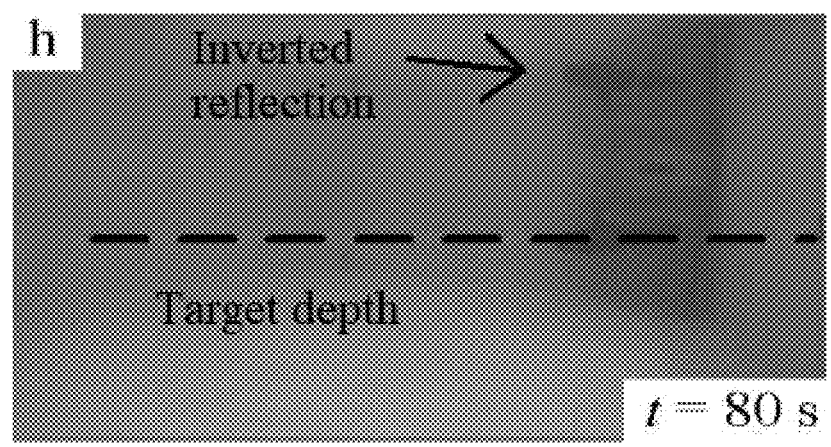
Figure 6I:
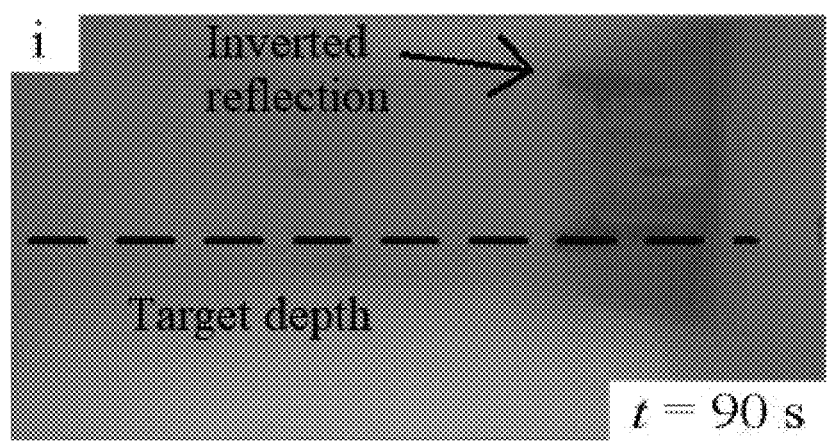

During the designing of the controller, it is necessary to calculate the velocity vector of the simplified dynamical model, but the current sensors used for precise underwater positioning are mostly bulky and expensive. In this regard, the present invention provides a velocity estimation algorithm based on a sliding mode observer. FIG. 5 shows the specific process of the gliding depth control method for the biomimetic gliding robotic dolphin, wherein, $d_r$ denotes the preset gliding depth, and $\psi_r$ denotes the preset yaw angle. Each module in FIG. 5 is illustrated as follows.

Firstly, measured values of sensors are obtained, including a measured value of the depth sensor, a measured value of the inertial navigation sensor, and a measured value of the piston position sensor of the buoyancy adjustment mechanism, namely depth information, inertial navigation information, piston information. Three-axis Euler angles, an angular velocity and an acceleration of the head of the robot are obtained as navigation information by the inertial navigation sensor through a nine-axis algorithm.

A real diving velocity is obtained according to the depth information d, and an estimated diving velocity ${}^g \tilde{U}_{bz}$ of the inertial coordinate system defines an estimated error s, as shown in formulas (5) and (6), respectively:

$${}^g U_{bz} = \dot{d} \quad (5)$$

$$s = {}^g U_{bz} - {}^g \tilde{U}_{bz} \quad (6)$$

wherein, $\dot{d}$ denotes a derivative of the depth information, and ${}^g U_{bz}$ denotes the real diving velocity.

Then, an estimated velocity of the global coordinate system is calculated according to a transformation relation between the inertial coordinate system and the dolphin coordinate system, as shown in formula (7):

$${}^g \dot{\tilde{U}}_b = {}^g R_b \hat{\Omega}_b \tilde{U}_b + 9 R_b \dot{\tilde{U}}_b + \begin{pmatrix} c_x \\ c_y \\ c_z \end{pmatrix} sat(s) \quad (7)$$

wherein, ${}^g \dot{\tilde{U}}_b$ denotes an estimated acceleration of the global coordinate system, $(c_x, c_y, c_z)$ denotes a weight vector of the sliding mode observer, and sat (s) denotes a saturation function. The saturation function is introduced to reduce the chattering effect of the sliding mode observer. ${}^gR_b$ denotes a rotation matrix from the dolphin coordinate system to the inertial coordinate system, $\dot{\Omega}_b$ denotes a skew-symmetric matrix of the angular velocity, and $\dot{\tilde{U}}_b = M^{-1}(-C(\tilde{U}_b)\tilde{U}_b - D\tilde{U}_b + \tau)$ denotes an estimated acceleration of the dolphin coordinate system. The estimated velocity can be obtained by iterative calculation according to the estimated acceleration.

Due to the gaps that typically exist between the mechanical structures, the biomimetic gliding robotic dolphin is prone to deflection in the yaw direction during the gliding process. Thus, it is necessary to modify the design of the yaw controller to satisfy the assumption of ignoring the lateral motion in the simplified dynamical model. Since the basic principle of the yaw motion depends on a differential hydrodynamic moment generated by the deflection of the pectoral fins on both sides of the biomimetic gliding robotic dolphin, and the hydrodynamic force is closely related to the velocity, when the velocity is relatively large, to avoid generating overshoot, the yaw control quantity should not be excessively large. Therefore, the present embodiment provides a design for yaw controller based on the velocity vector (estimated velocity) to obtain a control quantity, so as to control the deflection angles of the pectoral fins on both sides of the biomimetic gliding robotic dolphin.

Firstly, a weight coefficient $k_f$ of the yaw controller is obtained according to the estimated velocity, as shown in formula (8):

$$k_f = \frac{\sqrt{v_{ex}^2 + v_{ez}^2}}{v_{max}} \tag{8}$$

wherein, $v_{max}$ denotes a maximum gliding velocity, which is a constant value obtained by simulation, $v_{ex}$ denotes an estimated x-axis velocity, and $v_{ez}$ denotes an estimated z-axis velocity. Then, this coefficient is applied to a classic PID controller to obtain a final control quantity $u_f$, as shown in formula (9):

$$u_f = k_f(k_p e_\psi + k_i \int e_\psi + k_d \dot{e}_\psi) \tag{9}$$

wherein, $k_p$ denotes a proportional factor, $k_i$ denotes an integral factor, $k_d$ denotes a differential factor, $e_\psi$ denotes a yaw angle error, $\dot{e}_\psi$ denotes the derivative of the yaw angle error, and i denotes a subscript.

The control quantity is mapped directly to the left angle $\kappa_l$ and the right angle $\kappa_r$ of the pectoral fins by adjusting PID parameters. In the present embodiment, a yaw adjustment is preferably performed on only the pectoral fin on one side. Namely, when the pectoral fin on one side undergo deflection, the angle of the pectoral fin on the other side is zero. The adjustment method is shown in formula (10):

$$\begin{cases} \kappa_l = u_f, \kappa_r = 0, \text{ if deflected to the right} \\ \kappa_l = 0, \kappa_r = u_f, \text{ if deflected to the left} \end{cases} \tag{10}$$

Step S300: a segmented diving velocity reference trajectory is obtained by constructing and segmenting a Bézier curve based on the preset gliding depth and the depth information of the biomimetic gliding robotic dolphin at the current time, and a diving control quantity of the biomimetic gliding robotic dolphin is obtained by a model predictive control method in combination with the estimated velocity at the current time.

The slow response of gliding motion easily causes a large delay to the system, but the model predictive control is suitable for such a system and has a low requirement for the model accuracy. Therefore, according to the simplified dynamical model and the estimated velocity obtained above, the present invention provides a depth controller based on the model predictive control to achieve high-accuracy depth control by improving the reference trajectory. The specific process is as follows.

The simplified dynamical model above is converted into an expression in the form of discrete domains, as shown in formula (11):

$$w(k+1) = Aw(k) + Bu_c(k) + L(k) \tag{11}$$

wherein, $$A = 1 - \frac{d_2}{m_2}, \quad B = \frac{1}{m_2}, \quad L = -\frac{m_1}{m_2}u(k)q(k),$$

and k denotes a natural number.

In order to facilitate the expression, the system variables are unified and defined as shown in formula (12):

$$\xi(k \mid t) = \begin{pmatrix} w(k \mid t) \\ u_c(k-1 \mid t) \end{pmatrix} \tag{12}$$

wherein, (k|t) indicates k steps are predicted on basis of time t, then the simplified dynamical model is expressed as formulas (13) and (14):

$$\xi(k+1 \mid t) = \tilde{A}\xi(k \mid t) + \tilde{B}\Delta u_c(k \mid t) + \tilde{L}(t) \tag{13}$$

$$\eta(k \mid t) = \tilde{C}\xi(k \mid t) \tag{14}$$

wherein, $$\tilde{A} = \begin{pmatrix} A & B \\ 0 & 1 \end{pmatrix}, \tilde{B} = \begin{pmatrix} B \\ 1 \end{pmatrix}, \tilde{C} = (C \quad 0), \tilde{L} = \begin{pmatrix} L \\ 0 \end{pmatrix},$$

$\Delta u_c$ denotes a control increment, and $\eta(k|t)$ denotes an extended output quantity.

Then, the future state variables are iteratively predicted by setting the number $N_c$ of control steps and the number $N_p$ of prediction steps, as shown in formula (15):

$$\xi(k + N_c \mid t) = \tilde{A}^{N_c}\xi(k \mid t) + \tilde{A}^{N_c-1}\tilde{B}\Delta u_c(k \mid t) + \tag{15}$$

$$\ldots + \tilde{B}\Delta u_c(k + N_c - 1 \mid t) + \left(\sum_{i=0}^{N_c-1}\tilde{A}^i\right)\tilde{L}(t)$$

$$\vdots$$

$$\xi(k + N_p \mid t) = \tilde{A}^{N_p}\xi(k \mid t) + \tilde{A}^{N_p-1}\tilde{B}\Delta u_c(k \mid t) +$$

$$\ldots + \tilde{A}^{N_p-N_c-1}\tilde{B}\Delta u_c(k + N_c \mid t) + \left(\sum_{i=0}^{N_c-1}\tilde{A}^i\right)\tilde{L}(t)$$

In the present embodiment, the term L maintains a constant term during one prediction process to cancel the coupling between the diving velocity, the forward velocity and the pitching angular velocity. Moreover, the predicted state variables are unified and integrated to obtain formula (16):

$$Y(t)=\gamma\xi(k|t)+H\Delta U_c(t)+\Delta \qquad (16)$$

wherein, $Y(t)=(\eta(k+1|t), \ldots, \eta(k+N_c|t), \ldots, \eta(k+N_p|t))^T$, the superscript T denotes transpose operation $\gamma=(\check{C}\check{A}, \ldots \check{C}\check{A}^{N_c}, \ldots, \check{C}\check{A}^{N_p})^T$, $$\Delta = \left(I, \ldots, \sum_{i=0}^{N_c-1}\tilde{A}, \ldots, \sum_{i=0}^{N_p-1}\tilde{A}\right)^T \tilde{L}(t),$$

I denotes an identity matrix, and $$H = \begin{pmatrix} \check{C}\tilde{B} & 0 & \ldots & 0 \\ \vdots & \ldots & \ddots & \vdots \\ \check{C}\tilde{A}^{N_c-1}\tilde{B} & \ldots & \ldots & \check{C}\tilde{B} \\ \vdots & \ldots & \ldots & \vdots \\ \check{C}\tilde{A}^{N_p-1}\tilde{B} & \ldots & \ldots & \check{C}\tilde{A}^{N_p-N_c-1}\tilde{B} \end{pmatrix}.$$

Subsequently, an objective function of the model predictive control method is optimized to calculate the optimal solution of the control signal. The objective function should be chosen by considering two factors. First, the depth steady-state error (difference between the target depth and the actual depth) should be minimized. In the present invention, the control target is converted from the depth into the diving velocity, and the target depth can be reached by designing a suitable diving velocity reference trajectory. Second, the control increment is preferably not excessively large to avoid mechanical and electrical damage to the robot. Therefore, based on the foregoing considerations, the present invention provides an objective function based on a steady-state error and a control increment, as shown in formula (17):

$$J(\xi(t), \Delta U_c(t)) = \sum_{i=1}^{N_p}\|\eta(t+i|t)-\eta_{ref}(t+i|t)\|_Q^2 + \sum_{i=0}^{N_c-1}\|\Delta u_c(t+i|t)\|_R^2 \qquad (17)$$

where $J(\xi(t), \Delta U_c(t))$ denotes the objective function based on the steady-state error and the control increment, $\eta_{ref}(\bullet)$ denotes a reference trajectory, R denotes a control increment parameter, and Q denotes an error parameter.

The objective function is integrated into a matrix form to obtain formulas (18) and (19):

$$\min_{\Delta U_c(t)\in\varepsilon} J(\xi(t), \Delta U_c(t)) = \Delta U_c(t)^T\Omega\Delta U_c(t) + \Psi\Delta U_c(t) \qquad (18)$$

$$s.t.\begin{cases} \Delta U_c(t) \in [\Delta U_{cmin}, \Delta U_{cmax}] \\ U_c(t) \in [U_{cmin}, U_{cmax}] \end{cases} \qquad (19)$$

wherein, $\Omega=H^T\tilde{Q}H+\tilde{R}$, $\Psi=2E(t)_T\tilde{Q}H$, wherein $E(t)=\gamma\xi(k|t)+\Delta-Y_{ref}(t)$, $\Phi=E(t)^T\tilde{Q}E(t)$, $$\tilde{Q} = \underset{N_x\times N_p}{\text{diag}}\{Q, \ldots, Q\}$$

$$\tilde{R} = \underset{N_u\times N_c}{\text{diag}}\{R, \ldots, R\},$$

wherein $T_{ref}$ denotes the segmented diving velocity reference trajectory which is obtained in the next content, $N_x$ denotes the number of state quantities.

The control increment sequence within the control step is obtained by optimizing the feasible solution of the function above, as shown in formula (20):

$$\Delta U_c^*=(\Delta u_c(t)^* \ldots \Delta u_c(t+N_c-1)^*)^T \qquad (20)$$

wherein, $\Delta U_c^*$ denotes the control increment sequence, $\Delta u_c(t)^*$ denotes the optimal control quantity.

Then, the first value in the control increment sequence is chosen as the final control increment value to obtain the control quantity, as shown in formula (21):

$$u_c(t)=u_c(t-1)+\Delta u_c(t)^* \qquad (21)$$

With respect to a large time-delay system, overshoot can be avoided by designing a good reference trajectory. Therefore, the present invention provides a reference trajectory design method based on a Bézier curve. The Bézier curve is typically used to smooth a path, and the shape of the curve can be changed by setting different control points. The depth control system with minimum overshoot is desired. Therefore, in the present invention, the second-order Bézier curve is first applied to the depth reference trajectory based on the prediction step, and then the real-time diving velocity reference trajectory is obtained by calculating depth reference points. The depth reference trajectory $P_{ref}$ is designed as shown in formula (22):

$$P_{ref}(i)=(1-t(i))^2 d+2t(i)(1-t(i))^2 d_r+t(i)^2 d_r \qquad (22)$$

wherein, $$t = \frac{1}{N_p}(0\ 1\ \ldots\ N_p),$$

$d_r$ denotes a preset gliding depth, and d denotes a real-time depth, namely depth information.

The diving velocity reference trajectory is obtained by taking the derivative $V_{ref}=\dot{P}_{ref}$ of the depth reference trajectory. In actual control processes, the reference trajectory is designed differently according to different target depths. Therefore, the present invention provides a segmented reference trajectory design method, whereby reference trajectories at different phases are obtained by setting a depth threshold $d_{theshold}$ as shown in formula (23):

$$Y_{ref} = \begin{cases} c_1 V_{ref}, & \text{if } |d_r - d| > d_{theshold} \\ c_2 V_{ref}, & \text{otherwise} \end{cases} \qquad (23)$$

wherein, $Y_{ref}$ denotes the segmented diving velocity reference trajectory, and $c^1$ and $c_2$ denote weight coefficients. However, in practical applications, the present invention is not limited to the two-segment reference trajectory, and a multi-segment trajectory can be designed according to different target depths, and even continuous functions are designed to achieve depth control.

Step S400: a target position of a piston in a buoyancy adjustment mechanism of the biomimetic gliding robotic dolphin is obtained through a buoyancy principle according to the diving control quantity, and a control quantity of the piston is obtained according to a current position of the piston.

In the present embodiment, the depth control is realized through buoyancy adjustment under the gliding mode, and the buoyancy adjustment is realized by drawing or expelling water due to a movement of the piston in the mechanism. Thus, the obtained control quantity needs to be mapped into the position of the piston in the buoyancy adjustment mechanism. Considering that the physical significance of the control quantity is force, the target position of the piston can be obtained according to the buoyancy principle, and the calculation procedure is shown in formula (24):

$$r_{sr} = \frac{u_c(t)}{\rho g S} \quad (24)$$

wherein, $r_{sr}$ denotes the target position of the piston, $\rho$ denotes the density of water; g denotes the acceleration of gravity, and S denotes the bottom area of the cylindrical buoyancy adjustment mechanism. The motor has a large acceleration and deceleration under a position mode, but depth control is real-time and has a short control cycle. Thus, the position mode may cause damage to mechanical and electrical structures. In order to protect the buoyancy-driven mechanism, in the present invention, the motor is set under a velocity mode, and the PID controller is designed according to the velocity mode to realize the position loop for smooth movement.

Step S500: the biomimetic gliding robotic dolphin is controlled to glide based on the control quantity of the piston and the control quantity of the pectoral fins on both sides of the biomimetic gliding robotic dolphin.

In the present embodiment, the biomimetic gliding robotic dolphin is controlled to ascend and dive according to the control quantity of the piston, and the yaw adjustment of the biomimetic gliding robotic dolphin is controlled according to the control quantity of the pectoral fins on both sides of the biomimetic gliding robotic dolphin, thereby realizing gliding control of the biomimetic gliding robotic dolphin. FIGS. 6(A)-6(I) are schematic diagrams showing the gliding depth control experiment of the biomimetic gliding robotic dolphin at different times, wherein the black dashed line denotes the target depth, and the reflection from the water surface is the inverted reflection of the dolphin.

Figure 2:
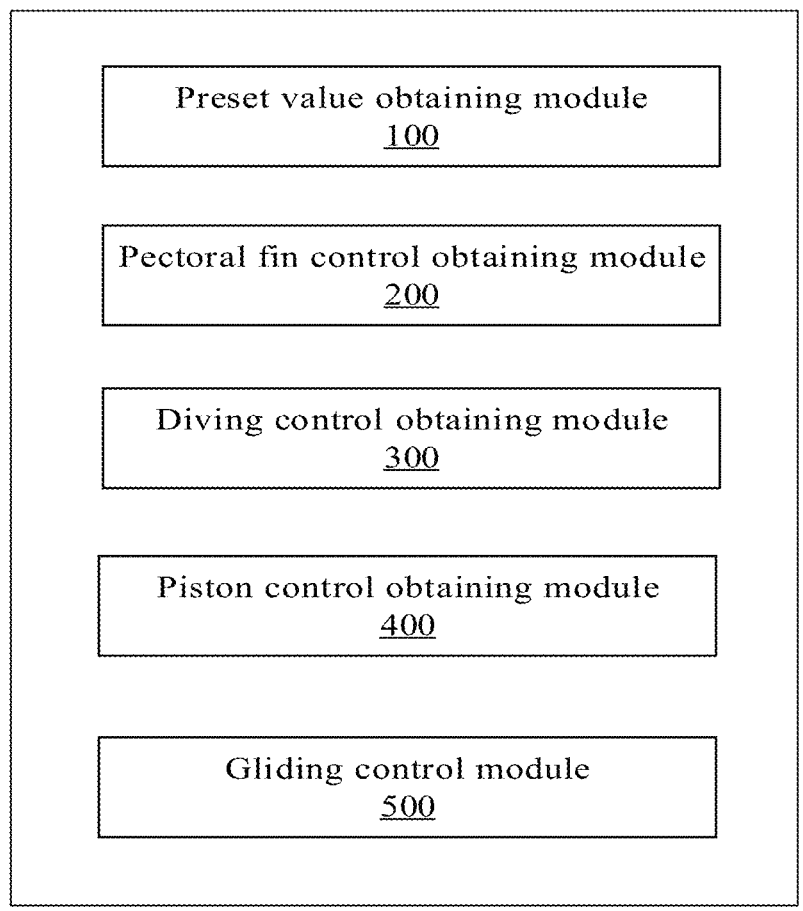
FIG. 2 is a frame diagram of the gliding depth control system for the biomimetic gliding robotic dolphin according to an embodiment of the present invention.

According to the second embodiment of the present invention, as shown in FIG. 2, a gliding depth control system for a biomimetic gliding robotic dolphin includes the preset value acquisition module 100, the pectoral fin control acquisition module 200, the diving control acquisition module 300, the piston control acquisition module 400, and the gliding control module 500.

The preset value acquisition module 100 is configured to obtain a preset gliding depth and a preset yaw angle.

The pectoral fin control acquisition module 200 is configured to obtain an estimated velocity by a sliding mode observer based on depth information and inertial navigation information of the biomimetic gliding robotic dolphin at a current time, and obtain a control quantity of pectoral fins on both sides of the biomimetic gliding robotic dolphin by a yaw controller in combination with the preset yaw angle.

The diving control acquisition module 300 is configured to obtain a segmented diving velocity reference trajectory by constructing and segmenting a Bézier curve based on the preset gliding depth and the depth information of the biomimetic gliding robotic dolphin at the current time, and obtain a diving control quantity of the biomimetic gliding robotic dolphin by a model predictive control method in combination with the estimated velocity at the current time.

The piston control acquisition module 400 is configured to obtain a target position of a piston in a buoyancy adjustment mechanism of the biomimetic gliding robotic dolphin through a buoyancy principle according to the diving control quantity, and obtain a control quantity of the piston according to a current position of the piston.

The gliding control module 500 is configured to control the biomimetic gliding robotic dolphin to glide based on the control quantity of the piston and the control quantity of the pectoral fins on both sides of the biomimetic gliding robotic dolphin.

It can be clearly understood by those skilled in the art that for the convenience and brevity of the description, the specific working process and related description of the system described above can refer to the corresponding processes in the foregoing embodiment of the method of the present invention, which will not be repeatedly described here.

It should be noted that the gliding depth control system for the biomimetic gliding robotic dolphin in the above embodiment is only exemplified by the division of the above functional modules. In practical applications, the above functions may be allocated to be implemented by different functional modules as needed, that is, the modules or steps in the embodiments of the present invention are further decomposed or combined. For example, the modules in the above embodiments can be combined into one module, or can be further split into a plurality of sub-modules to complete all or a part of the functions in the above description. The designations of the modules and steps involved in the embodiments of the present invention are only intended to distinguish these modules or steps, and should not be construed as an improper limitation to the present invention.

The third embodiment of the present invention provides a storage device, wherein a plurality of programs are stored in the storage device. The programs are configured to be loaded and executed by a processor to implement the gliding depth control method for the biomimetic gliding robotic dolphin described above.

A processing device according to the fourth embodiment of the present invention includes a processor and a storage device. The processor is configured to execute a plurality of programs, and the storage device is configured to store the plurality of programs. The programs are configured to be loaded and executed by the processor to implement the gliding depth control method for the biomimetic gliding robotic dolphin described above.

It can be clearly understood by those skilled in the art that for the convenience and brevity of the description, the specific working process and related description of the storage device and the processing device described above can refer to the corresponding processes in the foregoing embodiments of the method of the present invention, which will not be repeatedly described here.

Those skilled in the art can realize that the exemplary modules and method steps described with reference to the embodiments disclosed herein can be implemented by electronic hardware, computer software or a combination of the electronic hardware and the computer software. The programs corresponding to modules of software or steps of methods can be stored in a random access memory (RAM), a memory, a read-only memory (ROM), an electrically programmable ROM, an electrically erasable programmable ROM, a register, a hard disk, a removable disk, a compact disc read-only memory (CD-ROM), or any other form of storage mediums well-known in the art. In order to clearly illustrate the interchangeability of electronic hardware and software, in the above description, the compositions and steps of each embodiment have been generally described functionally. Whether these functions are implemented by electronic hardware or software depends on specific applications and design constraints of the technical solution. Those skilled in the art may use different methods to implement the described functions for each specific application, but such implementation should not be considered beyond the scope of the present invention.

The terms "first", "second" and the like are used to distinguish similar objects, rather than to describe or indicate a specific order or sequence.

The term "include/comprise" or any other similar terms are intended to cover non-exclusive inclusions, so that a process, method, article or apparatus/device including a series of elements not only includes those elements but also includes other elements that are not explicitly listed, or further includes elements inherent in the process, method, article or apparatus/device.

Hereto, the technical solutions of the present invention have been described in combination with the preferred implementations with reference to the drawings. However, it is easily understood by those skilled in the art that the scope of protection of the present invention is obviously not limited to these specific embodiments. Without departing from the principle of the present invention, those skilled in the art can make equivalent modifications or replacements to related technical features, and the technical solutions obtained through these modifications or replacements shall fall within the scope of protection of the present invention.

What is claimed is:

1. A gliding depth control method for a biomimetic gliding robotic dolphin, comprising:
   step S100: obtaining a preset gliding depth and a preset yaw angle;
   step S200: obtaining an estimated velocity by a sliding mode observer based on depth information and inertial navigation information of the biomimetic gliding robotic dolphin at a current time, and obtaining a control quantity of pectoral fins on both sides of the biomimetic gliding robotic dolphin by a yaw controller in combination with the preset yaw angle;
   step S300: obtaining a segmented diving velocity reference trajectory by constructing and segmenting a Bézier curve based on the preset gliding depth and the depth information of the biomimetic gliding robotic dolphin at the current time, and obtaining a diving control quantity of the biomimetic gliding robotic dolphin by a model predictive control method in combination with the estimated velocity at the current time;
   step S400: obtaining a target position of a piston in a buoyancy adjustment mechanism of the biomimetic gliding robotic dolphin through a buoyancy principle according to the diving control quantity, and obtaining a control quantity of the piston according to a current position of the piston; and
   step S500: controlling the biomimetic gliding robotic dolphin to glide based on the control quantity of the piston and the control quantity of the pectoral fins on the both sides of the biomimetic gliding robotic dolphin.

2. The gliding depth control method of claim 1, wherein a method for obtaining the estimated velocity by the sliding mode observer in step S200 comprises:
   constructing a full-state three-dimensional dynamical model corresponding to the biomimetic gliding robotic dolphin based on a coordinate system of the biomimetic gliding robotic dolphin;
   simplifying the full-state three-dimensional dynamical model by ignoring a lateral motion to obtain a simplified dynamical model; and
   obtaining a velocity vector of the simplified dynamical model by the sliding mode observer based on the depth information and the inertial navigation information of the biomimetic gliding robotic dolphin at the current time, and using the velocity vector as the estimated velocity of the biomimetic gliding robotic dolphin.

3. The gliding depth control method of claim 2, wherein the simplified dynamical model is expressed as:

$$M\dot{v}=-C(v)v-Dv+\tau,$$

wherein, $v=[u, w, q]^T$ denotes a forward velocity, a longitudinal velocity and a pitching angular velocity under a dolphin coordinate system, respectively; $M=\text{diag}\{m_1, m_2, m_3\}$ denotes an inertial mass matrix containing an added mass; $m_1$, $m_2$, $m_3$ denote mass parameters; $D=\text{diag}\{d_1, d_2, d_3\}$ denotes a damping matrix simplified as a constant term; $d_1$, $d_2$, $d_3$ denote damping parameters; $\tau=[0, u_c, \vec{a}G_m \sin(\theta)]$ denotes an input matrix; $u_c$ denotes a real-time control quantity; $\vec{a}$ denotes a position vector of a gravity center and a buoyancy center of the biomimetic gliding robotic dolphin; $G_m$ denotes an acceleration of gravity; $\theta$ denotes a pitch angle; $C(v)$ denotes a Coriolis force and centripetal force matrix; and $\dot{v}$ denotes a velocity derivative.

4. The gliding depth control method of claim 1, wherein a method for obtaining the control quantity of the pectoral fins on the both sides of the biomimetic gliding robotic dolphin by the yaw controller in step S200 comprises: calculating the control quantity of the pectoral fins by the following formula:

$$u_f=k_f(k_p e_\psi+k_i \int e_\psi+k_d \dot{e}_\psi),$$

wherein, $u_f$ denotes the control quantity of the pectoral fins on the both sides of the biomimetic gliding robotic dolphin, $k_f$ denotes a weight coefficient of the yaw controller, $k_p$ denotes a proportional factor, $k_i$ denotes an integral factor, $k_d$ denotes a differential factor, $e_\psi$ denotes a yaw angle error, and $\dot{e}_\psi$ denotes a derivative of the yaw angle error.

5. The gliding depth control method of claim 1, wherein a method for obtaining the segmented diving velocity reference trajectory by constructing and segmenting the Bézier curve in step S300 comprises:
   constructing a second-order Bézier curve trajectory based on the preset gliding depth and the depth information of the biomimetic gliding robotic dolphin at the current time, and using the second-order Bézier curve trajectory as a depth reference trajectory of the biomimetic gliding robotic dolphin;
   obtaining a diving velocity reference trajectory by taking a derivative of the depth reference trajectory; and
   segmenting the diving velocity reference trajectory according to an absolute value of a difference between the preset gliding depth and the depth information of the biomimetic gliding robotic dolphin at the current time and a value of a preset depth threshold, to obtain the segmented diving velocity reference trajectory.

6. The gliding depth control method of claim 5, wherein the segmented diving velocity reference trajectory is calculated as follows:

$$Y_{ref} = \begin{cases} c_1 V_{ref}, & \text{if } |d_r - d| > d_{theshold} \\ c_2 V_{ref}, & \text{otherwise} \end{cases}$$

wherein, $Y_{ref}$ denotes the segmented diving velocity reference trajectory, $c_1$ and $c_2$ denote weight coefficients, $d_r$ denotes the preset gliding depth, d denotes the depth information, $d_{theshold}$ denotes the preset depth threshold, and $V_{ref}$ denotes the diving velocity reference trajectory.

7. The gliding depth control method of claim 1, wherein a method for obtaining the target position of the piston in the buoyancy adjustment mechanism of the biomimetic gliding robotic dolphin through the buoyancy principle in step S400 comprises: calculating the the target position of the piston by the following formula:

$$r_{sr} = \frac{u_c(t)}{\rho g S},$$

wherein, $r_{sr}$ denotes the target position of the piston, $\rho$ denotes a density of water; g denotes an acceleration of gravity, S denotes a bottom area of the buoyancy adjustment mechanism, and $u_c(t)$ denotes the diving control quantity.

8. A storage device, wherein a plurality of programs are stored in the storage device; the plurality of programs are configured to be loaded and executed by a processor to implement the gliding depth control method of claim 1.

9. The storage device of claim 8, wherein a method for obtaining the estimated velocity by the sliding mode observer in step S200 comprises:
   constructing a full-state three-dimensional dynamical model corresponding to the biomimetic gliding robotic dolphin based on a coordinate system of the biomimetic gliding robotic dolphin;
   simplifying the full-state three-dimensional dynamical model by ignoring a lateral motion to obtain a simplified dynamical model; and
   obtaining a velocity vector of the simplified dynamical model by the sliding mode observer based on the depth information and the inertial navigation information of the biomimetic gliding robotic dolphin at the current time, and using the velocity vector as the estimated velocity of the biomimetic gliding robotic dolphin.

10. The storage device of claim 9, wherein the simplified dynamical model is expressed as:

$$M\dot{v} = -C(v)v - Dv + \tau,$$

wherein, $v = [u, w, q]^T$ denotes a forward velocity, a longitudinal velocity and a pitching angular velocity under a dolphin coordinate system, respectively; $M = \text{diag}\{m_1, m_2, m_3\}$ denotes an inertial mass matrix containing an added mass; $m_1, m_2, m_3$ denote mass parameters; $D = \text{diag}\{d_1, d_2, d_3\}$ denotes a damping matrix simplified as a constant term; $d_1, d_2, d_3$ denote damping parameters; $\tau = [0, u_c, \vec{a} G_m \sin(\theta)]$ denotes an input matrix; $u_c$ denotes a real-time control quantity; $\vec{a}$ denotes a position vector of a gravity center and a buoyancy center of the biomimetic gliding robotic dolphin; $G_m$ denotes an acceleration of gravity; $\theta$ denotes a pitch angle; C(v) denotes a Coriolis force and centripetal force matrix; and $\dot{v}$ denotes a velocity derivative.

11. The storage device of claim 8, wherein a method for obtaining the control quantity of the pectoral fins on the both sides of the biomimetic gliding robotic dolphin by the yaw controller in step S200 comprises: calculating the control quantity of the pectoral fins by the following formula:

$$u_f = k_f(k_p e_\psi + k_i e_\psi + k_d \dot{e}_\psi),$$

wherein, $u_f$ denotes the control quantity of the pectoral fins on the both sides of the biomimetic gliding robotic dolphin, $k_f$ denotes a weight coefficient of the yaw controller, $k_p$ denotes a proportional factor, $k_i$ denotes an integral factor, $k_d$ denotes a differential factor, $e_\psi$ denotes a yaw angle error, and $\dot{e}_\psi$ denotes a derivative of the yaw angle error.

12. The storage device of claim 8, wherein a method for obtaining the segmented diving velocity reference trajectory by constructing and segmenting the Bézier curve in step S300 comprises:
   constructing a second-order Bézier curve trajectory based on the preset gliding depth and the depth information of the biomimetic gliding robotic dolphin at the current time, and using the second-order Bézier curve trajectory as a depth reference trajectory of the biomimetic gliding robotic dolphin;
   obtaining a diving velocity reference trajectory by taking a derivative of the depth reference trajectory; and
   segmenting the diving velocity reference trajectory according to an absolute value of a difference between the preset gliding depth and the depth information of the biomimetic gliding robotic dolphin at the current time and a value of a preset depth threshold, to obtain the segmented diving velocity reference trajectory.

13. The storage device of claim 12, wherein the segmented diving velocity reference trajectory is calculated as follows:

$$Y_{ref} = \begin{cases} c_1 V_{ref}, & \text{if } |d_r - d| > d_{theshold} \\ c_2 V_{ref}, & \text{otherwise} \end{cases},$$

wherein, $Y_{ref}$ denotes the segmented diving velocity reference trajectory, $c_1$ and $c_2$ denote weight coefficients, $d_r$ denotes the preset gliding depth, d denotes the depth information, $d_{theshold}$ denotes the preset depth threshold, and $V_{ref}$ denotes the diving velocity reference trajectory.

14. The storage device of claim 8, wherein a method for obtaining the target position of the piston in the buoyancy adjustment mechanism of the biomimetic gliding robotic dolphin through the buoyancy principle in step S400 comprises: calculating the the target position of the piston by the following formula:

$$r_{sr} = \frac{u_c(t)}{\rho g S},$$

wherein, $r_{sr}$ denotes the target position of the piston, ρ denotes a density of water; g denotes an acceleration of gravity, S denotes a bottom area of the buoyancy adjustment mechanism, and $u_c(t)$ denotes the diving control quantity.

15. A processing device, comprising a processor and a storage device, wherein the processor is configured to execute a plurality of programs, and the storage device is configured to store the plurality of programs; the plurality of programs are configured to be loaded and executed by the processor to implement the gliding depth control method of claim 1.

16. The processing device of claim 15, wherein a method for obtaining the estimated velocity by the sliding mode observer in step S200 comprises:
   constructing a full-state three-dimensional dynamical model corresponding to the biomimetic gliding robotic dolphin based on a coordinate system of the biomimetic gliding robotic dolphin;
   simplifying the full-state three-dimensional dynamical model by ignoring a lateral motion to obtain a simplified dynamical model; and
   obtaining a velocity vector of the simplified dynamical model by the sliding mode observer based on the depth information and the inertial navigation information of the biomimetic gliding robotic dolphin at the current time, and using the velocity vector as the estimated velocity of the biomimetic gliding robotic dolphin.

17. The processing device of claim 16, wherein the simplified dynamical model is expressed as:

$$M\dot{v} = -C(v)v - Dv + \tau,$$

wherein, $v = [u, w, q]^T$ denotes a forward velocity, a longitudinal velocity and a pitching angular velocity under a dolphin coordinate system, respectively; $M = \text{diag}\{m_1, m_2, m_3\}$ denotes an inertial mass matrix containing an added mass; $m_1, m_2, m_3$ denote mass parameters; $D = \text{diag}\{d_1, d_2, d_3\}$ denotes a damping matrix simplified as a constant term; $d_1, d_2, d_3$ denote damping parameters; $\tau = [0, u_c, \vec{a}G_m\sin(\theta)]$ denotes an input matrix; $u_c$ denotes a real-time control quantity; $\vec{a}$ denotes a position vector of a gravity center and a buoyancy center of the biomimetic gliding robotic dolphin; $G_m$ denotes an acceleration of gravity; θ denotes a pitch angle; $C(v)$ denotes a Coriolis force and centripetal force matrix; and $\dot{v}$ denotes a velocity derivative.

18. The processing device of claim 15, wherein a method for obtaining the control quantity of the pectoral fins on the both sides of the biomimetic gliding robotic dolphin by the yaw controller in step S200 comprises: calculating the control quantity of the pectoral fins by the following formula:

$$u_f = k_f(k_p e_\psi + k_i \int e_\psi + k_d \dot{e}_\psi),$$

wherein, $u_f$ denotes the control quantity of the pectoral fins on the both sides of the biomimetic gliding robotic dolphin, $k_f$ denotes a weight coefficient of the yaw controller, $k_p$ denotes a proportional factor, $k_i$ denotes an integral factor, $k_d$ denotes a differential factor, $e_\psi$ denotes a yaw angle error, and $\dot{e}_\psi$ denotes a derivative of the yaw angle error.

19. The processing device of claim 15, wherein a method for obtaining the segmented diving velocity reference trajectory by constructing and segmenting the Bézier curve in step S300 comprises:
   constructing a second-order Bézier curve trajectory based on the preset gliding depth and the depth information of the biomimetic gliding robotic dolphin at the current time, and using the second-order Bézier curve trajectory as a depth reference trajectory of the biomimetic gliding robotic dolphin;
   obtaining a diving velocity reference trajectory by taking a derivative of the depth reference trajectory; and
   segmenting the diving velocity reference trajectory according to an absolute value of a difference between the preset gliding depth and the depth information of the biomimetic gliding robotic dolphin at the current time and a value of a preset depth threshold, to obtain the segmented diving velocity reference trajectory.

20. A gliding depth control system for a biomimetic gliding robotic dolphin, comprising a preset value acquisition module, a pectoral fin control acquisition module, a diving control acquisition module, a piston control acquisition module, and a gliding control module; wherein
   the preset value acquisition module is configured to obtain a preset gliding depth and a preset yaw angle;
   the pectoral fin control acquisition module is configured to obtain an estimated velocity by a sliding mode observer based on depth information and inertial navigation information of the biomimetic gliding robotic dolphin at a current time, and obtain a control quantity of pectoral fins on both sides of the biomimetic gliding robotic dolphin by a yaw controller in combination with the preset yaw angle;
   the diving control acquisition module is configured to obtain a segmented diving velocity reference trajectory by constructing and segmenting a Bézier curve based on the preset gliding depth and the depth information of the biomimetic gliding robotic dolphin at the current time, and obtain a diving control quantity of the biomimetic gliding robotic dolphin by a model predictive control method in combination with the estimated velocity at the current time;
   the piston control acquisition module is configured to obtain a target position of a piston in a buoyancy adjustment mechanism of the biomimetic gliding robotic dolphin through a buoyancy principle according to the diving control quantity, and obtain a control quantity of the piston according to a current position of the piston; and
   the gliding control module is configured to control the biomimetic gliding robotic dolphin to glide based on the control quantity of the piston and the control quantity of the pectoral fins on the both sides of the biomimetic gliding robotic dolphin.

\* \* \* \* \*